(12) United States Patent
Takase et al.

(10) Patent No.: US 6,922,296 B2
(45) Date of Patent: Jul. 26, 2005

(54) OPTICAL PATH ADJUSTING DEVICE

(75) Inventors: Yoshiyuki Takase, Saitama (JP); Shuzo Kimura, Saitama (JP)

(73) Assignee: Fujinon Corporation, Saitama (JP)

( * ) Notice: Subject to any disclaimer, the term of this patent is extended or adjusted under 35 U.S.C. 154(b) by 1018 days.

(21) Appl. No.: 09/822,313

(22) Filed: Apr. 2, 2001

(65) Prior Publication Data

US 2002/0051245 A1 May 2, 2002

(30) Foreign Application Priority Data

Mar. 31, 2000 (JP) ........................................ 2000-096867

(51) Int. Cl.⁷ ............................................... G02B 7/02
(52) U.S. Cl. ...................................... 359/822; 359/819
(58) Field of Search ................................ 359/694, 819, 359/821, 822

(56) References Cited

U.S. PATENT DOCUMENTS 4,033,683 A * 7/1977 Tancredi ........................ 353/7
4,881,814 A * 11/1989 Hoult .......................... 356/455
2005/0002001 A1 * 1/2005 Yoon .......................... 353/119

FOREIGN PATENT DOCUMENTS

JP          63-101807          5/1988

* cited by examiner

*Primary Examiner*—Georgia Epps
(74) *Attorney, Agent, or Firm*—Young & Thompson

(57) ABSTRACT

An optical path adjusting device comprises a hollow cylindrical mount having a center axis in alignment with an optical path of a light beam and an optical parallel mounted on the hollow cylindrical barrel so as to intersect the optical path of the light beam at a specified angle of intersection. The hollow cylindrical barrel is supported so as to rotate about an original optical path of the light beam, thereby causing a displacement of an optical path of said light beam coming out of the optical parallel close to or away from the original optical path of the light beam.

9 Claims, 6 Drawing Sheets

OPTICAL PATH ADJUSTING DEVICE

BACKGROUND OF THE INVENTION

1. Field of the Invention

The present invention relates to an optical path adjusting device for shifting an optical path of a light beam coming out of the optical path adjusting device in parallel with an original optical path of the light beam, and more particularly, to an optical path adjusting device equipped with an optical parallel operative to cause a displacement of an optical path of a light beam coming out of the optical path adjusting device from an original optical path and vary a vertical position of the light beam with respect to the original path.

2. Description of the Related Art

In order for an optical instrument to direct a light beam from a light source to a specific optical element, it is necessary to adjust an optical path of the light beam so that the light beam impinges on the specific optical element. For example, there have been well known a variety of image forming machines, such as copy machines, printers and facsimile machines, for forming a subject image on a recording paper. Such an image forming machine is equipped with an optical scanning device operative to scan an image carrier such as a photosensitive drum with an image information bearing scanning beam such as a laser beam emanating from a semi-conductor laser source. The optical scanning device has a scanning optical system comprising a rotary polygon mirror operative to reflect and deflect an image information bearing scanning beam and an fθ lens system which performs regulation of the scanning beam after deflection necessary to form an image without producing distortion, and reflection optical means for directing the scanning beam to an image carrier rotating in a specified direction such as a rotary photosensitive drum so as to scan the photosensitive drum with the scanning beam, thereby forming an electrostatic latent image on the photosensitive drum. The electrostatic latent image on the photosensitive drum is developed as a toner image and then transferred to a printing medium such as a printing paper.

In order for the optical scanning device to scan the photosensitive drum precisely, it is essential to adjust an optical path of scanning beam so that the scanning beam impinges on the polygon mirror in a specified position. For the adjustment of optical path of scanning beam, it has been known to use an optical parallel such as disclosed in, for example, Japanese Unexamined Patent Publication No. 63-101807, entitled "an optical path adjusting device". One of the prior art optical parallel adjusting devices is shown in FIG. 8.

Referring to FIG. 8, the optical parallel 81 made of a transparent glass having an appropriate refractive index is mounted on a support frame 82. The support frame 82 is pivoted by a pivot shaft 82a so as to swing about a pivotal axis Y intersecting an optical path of scanning beam S passing through the optical parallel 81. When swinging the support frame 82 through a certain angle, an angle of the scanning beam incident upon the optical parallel 81 changes according to the angle of swing, so that the scanning beam after passing the optical parallel 81 travels in an optical path shifted in parallel with an optical path in which the scanning beam before passing the optical parallel 81 travels.

One type of image forming machine equipped with an optical scanning device employs a plurality of scanning beams and reflection and deflection means common to the scanning beams. Another type of image forming machine equipped with an optical scanning device, which is called a tandem type image forming machine, employs a plurality of scanning beams and a plurality of reflection and deflection means one for each scanning beam. The former type is advantageous to compactness and simple controllability of the image forming machines. For example, such a color image forming machine for recording a color image is typically equipped with an optical scanning device that uses four scanning beams, namely a yellow (Y) image information bearing scanning beam, a magenta (M) image information bearing scanning beam, a cyan (C) image information bearing scanning beam and a black (BL) image information bearing scanning beam with which a photosensitive image carrier is scanned to form an electrostatic latent image thereon. Another image forming machine is provided with an optical scanning device which uses two scanning beams with an intention to form an image quickly. The two scanning beams scan a photosensitive image carrier simultaneously but at different positions, respectively, so as to enable quick image forming.

In the image forming machine which employs a plurality of scanning beams, an electrostatic latent image formed on the image carrier is made blurred and distorted if the scanning beams are out of specified relative scanning position on the image carrier. Therefore, it is essential for the image forming machine which employs a plurality of scanning beams to adjust optical paths of scanning beams precisely. However, it is troublesome to adjust an optical path of scanning beam by the prior art optical parallel adjusting device. As shown in FIG. 8, because the pivotal axis Y of the pivot shaft 82a intersects, directly or spatially, the optical path of scanning beam S, an incident angle of scanning beam upon the optical parallel 81 changes greatly even for a small angle of swing of the optical parallel 81. In addition, because a change in the incident angle of scanning beam upon the optical parallel 81 depends only upon an angle of swing of the pivot shaft 82a, it is difficult to achieve precise adjustment of an incident angle of scanning beam upon the optical parallel 81 by the prior art optical parallel adjusting device.

Although the pivot shaft 82a is secured to a housing frame of the optical scanning device by an adhesive after the adjustment of incident angle of scanning beam upon the optical parallel 81 in order to fix the incident angle of scanning beam, the adhesive possibly comes off from the pivot shaft 82a due to vibrations while the image forming machine operates after a lapse of long time. In the event of exfoliation of the adhesive, the optical parallel 81 easily and accidentally swings, so that the incident angle of scanning beam upon the optical parallel 81 changes. The accidental swing of the optical parallel 81 results in producing of a blurred image or an unclear image.

SUMMARY OF THE INVENTION

It is therefore an object of the present invention to provide an optical path adjusting device equipped with an optical parallel which makes it easy to achieve fine adjustment of the optical parallel.

It is another object of the present invention to provide an optical path adjusting device having an optical parallel which eliminates an easy occurrence of an accidental change in adjusted position of the optical parallel.

The foregoing objects of the present invention are accomplished by an optical path adjusting device equipped with an optical parallel having plane parallel surfaces for an optical scanning device in which the optical parallel is capable of varying a relative angle to a light beam incident upon the optical parallel to cause a displacement of an optical path of the light beam coming out of the optical parallel from an original optical path of the light beam so as thereby to provide an optical path of the light beam coming out of the optical parallel which is parallel with the original optical path. The optical path adjusting device comprises an optical parallel having plane parallel surfaces, and a mount for mounting the optical parallel thereon so that the optical parallel intersects the original optical path of the light beam impinging on the optical parallel at an angle greater or less than a right angle. The mount is supported for rotation about the original optical path on the optical scanning device.

In the case where the axis of rotation of the optical parallel is coincident with the optical path of a light beam impinging on the optical parallel, the optical path of the light beam coming out of the optical parallel displaces from the axis of rotation, i.e. the original optical path. In addition, when turning the optical parallel about the axis of rotation, the optical parallel varies a relative angle to the light beam incident thereon, so that the optical path of the light beam coming out of the optical parallel moves in a circle with a radius equal to the displacement, in other words, that the optical path of the light beam coming out of the optical parallel shifts its vertical position with respect to the original optical path. Therefore, the vertical position of the light beam coming out of the optical parallel is adjusted by varying an angle of turn of the optical parallel. A shift of vertical position of the light beam coming out of the optical parallel is small as compared with an angle of turn of the optical parallel. The small shift of vertical position of a light beam per unit angle of turn of the optical parallel enables precise adjustment of a vertical position of the light beam coming out of the optical parallel.

The axis of rotation of the optical parallel is not always essential to be coincident with the optical path of a light beam incident upon the optical parallel and, however, necessary to intersect the optical parallel at an angle greater or less than a right angle.

The mount may comprise a hollow cylindrical body so configured as to mount the optical parallel inclined at the relative angle. The hollow cylindrical body is supported with the axis of rotation in alignment with the original optical path on the optical scamming device. The hollow cylindrical body can be easily turned on, for example, a pedestal having a circular-arcuate support surface coincident with an outer shape of the hollow cylindrical body. Therefore, it is easy to adjust a relative angle of a light beam incident upon the optical parallel, and hence a vertical position of an optical path of the light beam coming out of the optical parallel from the original optical path. Furthermore, the hollow cylindrical body can be easily secured to the pedestal after the adjustment of vertical position of the optical path. While the hollow cylindrical body may not always have a circular cross section as long as allowing a light beam passing through the body, it is preferred for the hollow cylindrical body to have a circular cross section in light of workability.

The hollow cylindrical body at one of opposite ends may have a surface inclined at the relative angle on which the optical parallel is mounted. More preferably, the surface is inclined at the relative angle with respect to a center axis thereof. This configuration makes it quite easy to secure the optical parallel to the hollow cylindrical body as compared with the structure that the optical parallel is fixedly installed in the inside of the hollow cylindrical body. Further, hollow cylindrical body may have a hollow cylindrical extension coaxial with the hollow cylindrical body. The hollow cylindrical extension has an external diameter greater than that of the hollow cylindrical body. The hollow cylindrical extension thus formed can allow itself to securely mount a large size of optical parallel thereon. In addition, it can function as a stopper for preventing axial movement of the hollow cylindrical body during adjustment of a vertical position of an optical path of a light beam coming out of the optical parallel and, in consequence, providing easy and stable adjustment of the optical path of the light beam.

The pedestal may have a V-shaped support structure formed by surfaces arranged at a certain angle. This support structure provides reliable support of the hollow cylindrical body and improved workability of the pedestal.

The optical path adjusting means may have a mechanism for swinging the optical parallel about an axis perpendicular to the center axis of the hollow cylindrical body. The swing of the optical parallel about the axis perpendicular to the center axis of the hollow cylindrical body varies a displacement of the optical path of a light beam coming out of the optical parallel. Therefore, when turning the optical parallel about the center axis of the hollow cylindrical body after having varied the displacement of optical path, a vertical position of the optical path of the light beam coming out of the optical parallel is finely adjusted.

BRIEF DESCRIPTION OF THE DRAWINGS

The above and other objects and features of the present invention will be clearly understood from the following description with respect to the preferred embodiment thereof when considered in conjunction with the accompanying drawings, wherein the same reference numerals have been used to denote the same or similar parts or elements, and in which.

DETAILED DESCRIPTION OF THE PREFERRED EMBODIMENTS

Parts which are not direct importance to the invention and parts which are purely of conventional construction will not be described in detail. For example, details of the optical scanning device comprising polygon deflection mirror, the fθ lens system, etc, and the image forming device will not be set out in detail since their construction and operation can be easily arrived by those skilled in the art.

Figure 3:
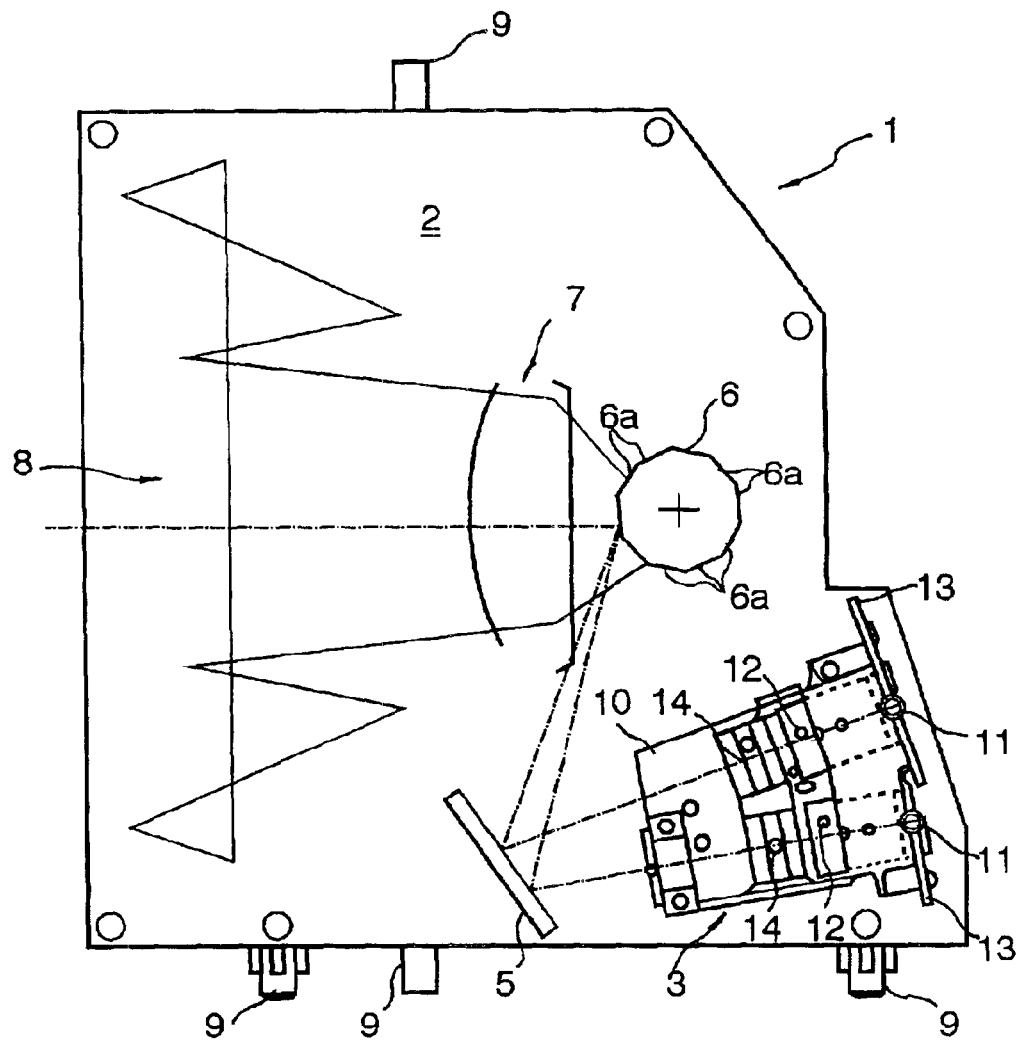
FIG. 3 is a plane view of an optical scanning device equipped with the light source unit shown in FIG. 2.

Referring to the drawings in detail and, in particular, to FIG. 3, there is shown an optical scanning device 1 which is equipped with an optical path adjusting device 15 in accordance with a preferred embodiment of the present invention in order to adjust an optical path of a scanning beam. The optical scanning device 1 comprises a generally box-shaped plastic housing 2 comprising a base wall 2a and a side wall 2b. A light source unit 3 fixedly mounted on a light source mount 10 is fixedly mounted to the plastic housing 2 at one of corners thereof. The light source unit 3 includes a pair of light sources such as laser sources 11, for example laser diodes, that emit laser beams as scanning beams, respectively.

Figure 4:
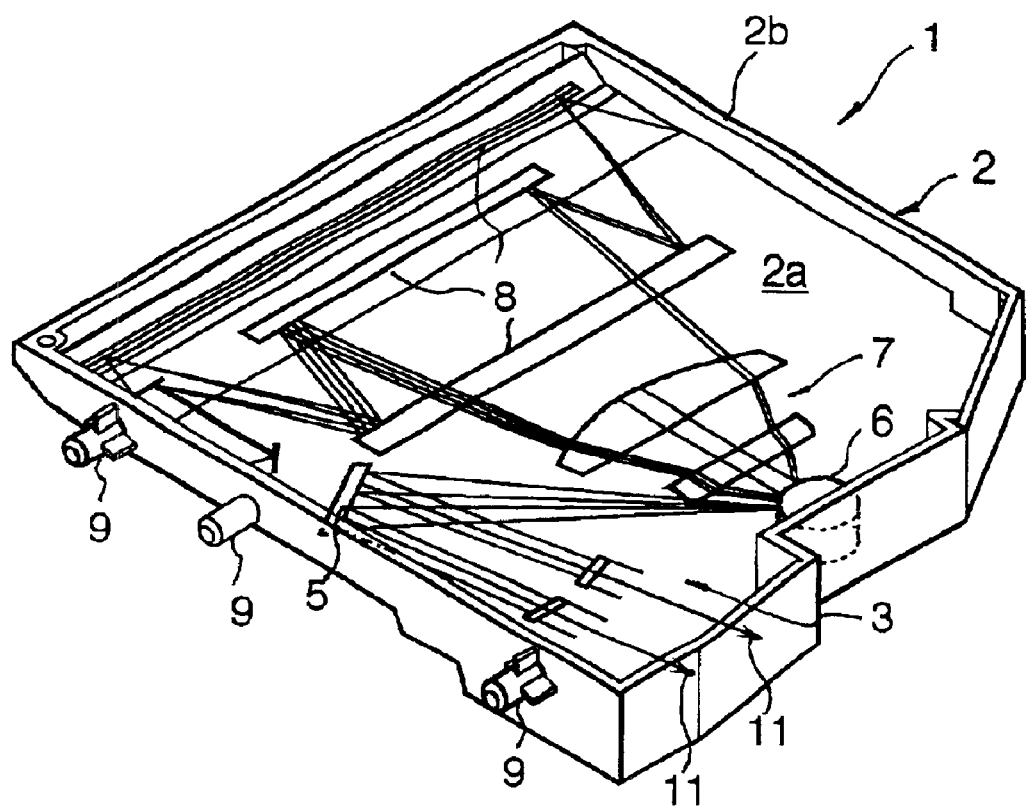
FIG. 4 is a schematic perspective view of the optical scanning device shown in FIG. 4.

As shown in detail in FIG. 4, a scanning optical system is mounted on the base wall 2a of the housing 2. This scanning optical system includes a stationary reflection mirror 5, a polygon mirror 6 as reflective deflection means and a stationary arrangement of reflection mirrors 8. The reflection mirror 5 is positioned so as to reflect and direct the scanning beams emanating from the laser sources 11 to the deflection polygon mirror 6. The deflection polygon mirror 6 has an equilateral cross section and is formed with reflective surface at its side facets 6a. The deflection polygon mirror 6, is mounted for rotation on the base wall 2a, so as to reflect and deflect the scanning beams impinging on the reflective facets 6a in order. Specifically, as the deflection polygon mirror 6 rotates, a reflective facet 6a changes an angle relative to the reflection mirror 5, as a result of which, a reflection angle of the scanning beam incident upon the reflective facet 6a continuously varies. The scanning beam reflected and deflected by the deflection polygon mirror 6 travels to an fθ lens system 7 and regulated by the fθ lens system 7 for modification suitable for scanning. Thereafter, the scanning beam is reflected back and forth by the reflection mirror arrangement 8 and is finally directed toward an image carrier of an image forming machine (not shown) such as a photosensitive drum so as to scan the image carrier.

The housing 2 is provided with a plurality of positioning bosses 9 extending laterally outward from the side wall 2b. When installing the optical scanning device 1 to the image forming machine, the positioning bosses 9 of the positioning housing 2 are fitted into circular or semi-circular positioning recesses formed in a housing frame of the image forming machine so as thereby to put the optical scanning device 1 in a predetermined relative position to the image carrier of the image forming machine which is scanned by the scanning beam. While the deflection polygon mirror 6 rotates at a predetermined fixed speed, the scanning beams is reflected and deflected continuously by the reflective facets 6a so as to scan the image carrier. In this specification, a direction in which the deflection polygon mirror 6 deflects the scanning beam is referred to as a primary scanning direction. A direction perpendicular to the primary scanning direction, or a direction in which the image carrier, i.e. the photosensitive drum in this embodiment, rotates is referred to as a secondary scanning direction.

Figure 1:
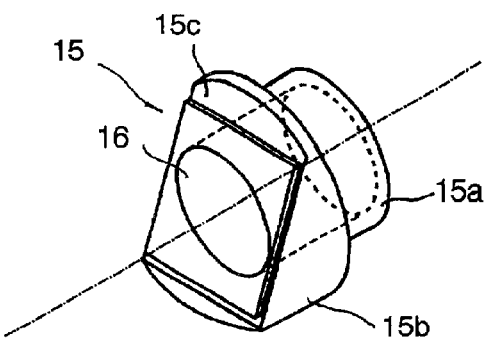
FIG. 1 is a perspective view of an optical path adjusting device having an optical parallel in accordance with a preferred embodiment of the present invention.
Figure 2:
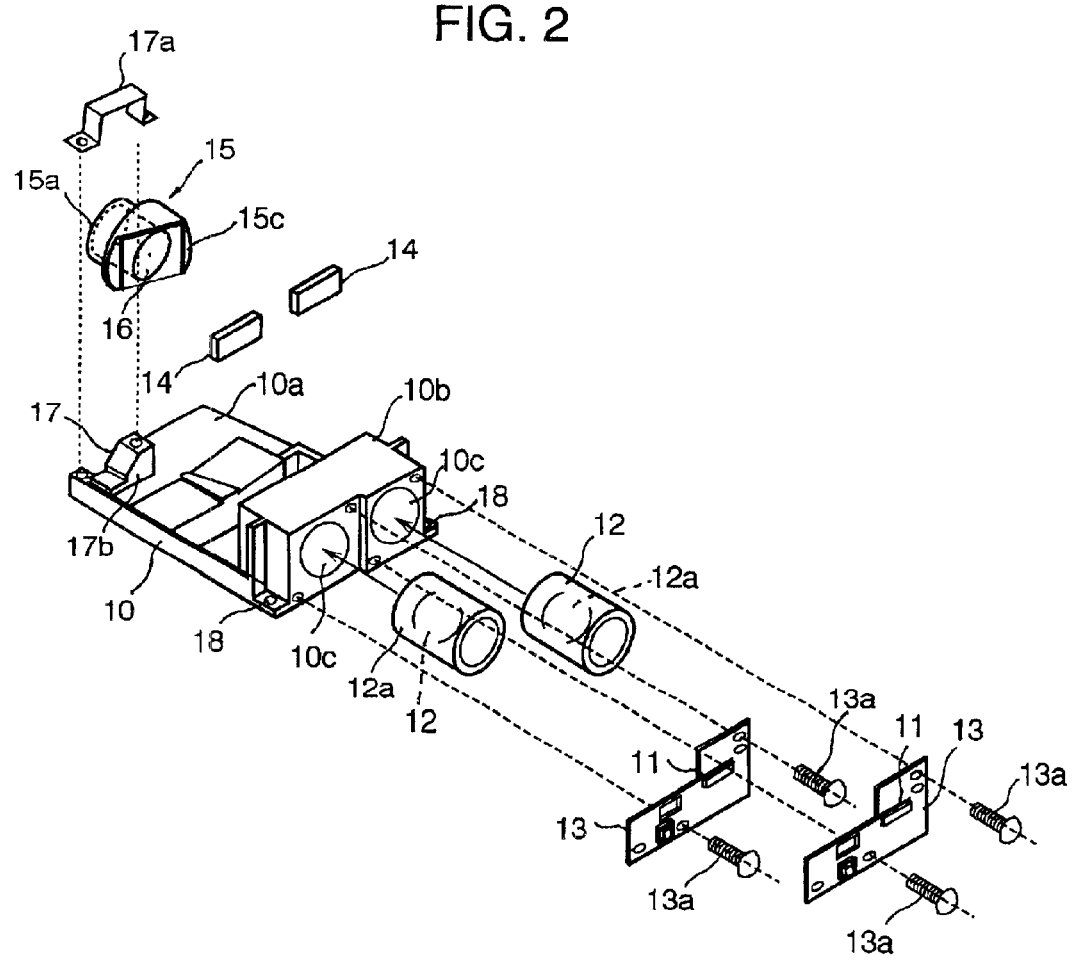
FIG. 2 is an exploded perspective view of a light source unit of an optical scanning device in which the optical path adjusting device of FIG. 1 is installed.

Referring to FIG. 2. the light source mount 10 on which the light source unit 3 is fixedly mounted is made of a member such as aluminium, aluminium alloys, sintered metals and other metals which are hardly deformable due to a change in ambient temperature and have small coefficients of linear expansion. The light source mount 10 is preferred to be made of a member which is hardly deformable due to certain external force such as stress caused by deformation of the housing 2 and exerted on the light source mount 10. In this instance, the light source unit 3 comprises the pair of laser sources 11 and a pair of optical systems that regulate the laser beams emanating from the laser sources 11 to specified optical characteristics, respectively. Specifically, the light source mount 10 comprises a base wall 10a and a lens mount 10b at a rear end of the base wall 10a which are formed as one integral piece. The light source unit 3 comprises, in addition to the laser sources 11, a pair of collimator lenses 12 and a pair of cylindrical lenses 14. Specifically, the lens mount 10b is formed with bores 10c in which the collimator lenses 12 are fixedly held. The cylindrical lenses 14 are mounted on the base wall 10a on a side of the lens mount 10b remote from the laser sources 11 such that the cylindrical lenses 14 are in coaxial with the collimator lenses 12, respectively. Laser source boards 13 to which the laser sources 11 are fixedly mounted are secured to the lens mount 10b by set screws 13a such that the laser sources 11 are in alignment with axes of the collimator lenses 12, respectively.

In front of either one of the cylindrical lenses 14 there is disposed an optical path adjusting device 15 mounted on a V-shaped support mount 17 forming part of the base wall 10a of the light source mount 10. The optical path adjusting device 15 comprises a front hollow cylindrical block 5a and a rear hollow cylindrical block 15b which are formed as one integral piece. A bore of the front hollow cylindrical block 15a is continuous to a bore of the rear hollow cylindrical block 15b. The rear hollow cylindrical block 15b has an external diameter greater than that of the front hollow cylindrical block 15a. The front hollow cylindrical block 15a is supported for rotation on the V-shaped support mount 17 by a generally U-shaped leaf spring 17a. The rear hollow cylindrical block 15b at its rear end is formed with a support slope 15c intersecting an center axis of the hollow cylindrical blocks 15a and 15b, and hence the axis of the collimator lens 12 at a certain angle less or greater than 90°. An optical parallel 16, a glass plate having plane parallel surfaces, is supported on the support slope 15c of the rear hollow cylindrical block 15b, so that the surfaces of the optical parallel 16 intersect the optical axis of the collimator lens 12 at the certain angle. The V-shaped support mount 17 and the cylindrical block portion 15a, of the optical path adjusting device 15 are configured such that the axis of rotation of the front hollow cylindrical block 15a. of the optical path adjusting device 15 is in alignment with the optical axis of the collimator lens 12.

According to the optical path adjusting device 15, when a scanning beam impinges on the optical parallel 16 at an incident angle, the scanning beam coming out of the optical parallel 16 displaces away from the original optical path which is referred to an optical path in which the scanning beam originally travels if there is no optical parallel 16, and hence the axis of the collimator lens 12. The optical path of the scanning beam coming out of the optical parallel 16 is parallel with the optical path of the scanning beam impinging on the optical parallel 16. The displacement of the optical path of the scanning beam coming out of the optical parallel 16 depends upon an incident angle of the scanning beam impinging on the optical parallel 16. The optical path of the scanning beam coming out of the optical parallel 16 turns in a circle with a radius equal to the displacement from the original optical path of the scanning beam as the optical parallel 16 of the optical path adjusting device 15 turns about the axis of rotation thereof. Accordingly, a vertical position of the scanning beam coming out of the optical parallel 16 with respect to another scanning beam which does not pass through the s after the light source mount 10 can be adjusted as required by turning the optical path adjusting device 15, i.e. the optical parallel 16.

The light source mount 10 is formed with positioning holes 18 at opposite corners of the lens mount 10b thereof. On the other hand, the housing 2 is provided with positioning bosses (not shown) fitable into the positioning holes 18. Therefore, after installing the light source mount 10 to the housing 2 by bringing the positioning bosses into engagement with the positioning holes 18, the light source mount 10 is fixedly located in the housing 2 in a predetermined relative position, so as thereby to direct the scanning beams emanating from the laser sources 11 to the reflection mirror 5.

Figure 5A:
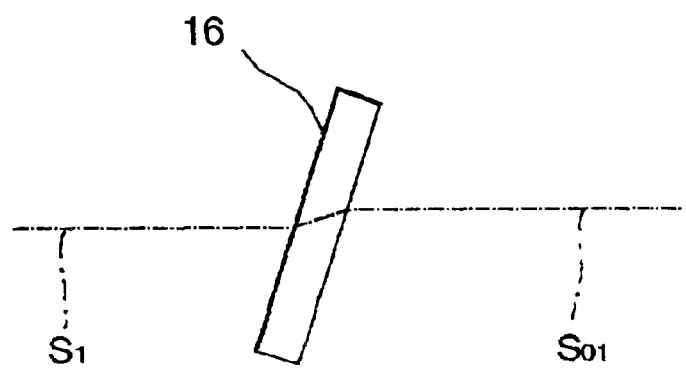
FIGS. 5A and 5B are explanatory views showing the principle of optical path adjustment by the optical path adjusting device having an optical parallel of the present invention.
Figure 5B:
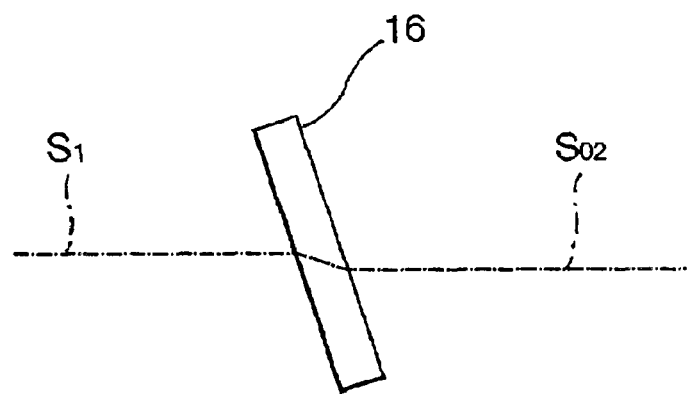

In optical path adjusting operation by the optical path adjusting device 15 structured as described above, after installing optical elements, i.e. the laser source boards 13 with the laser sources 11 mounted thereon respectively, the collimator lenses 12, the cylindrical lenses 14 and the optical path adjusting device 15, to the light source mount 10, optical path adjustment by the optical path adjusting device 15 is made so that the scanning beams emanating from the laser sources 11 are parallel with each other and are directed toward the reflection mirror 5 keeping a desired lateral distance therebetween. Specifically, the laser beams emanating the laser sources 11, respectively, are collimated by the collimator lenses 12, respectively, and focused on a plane at a distance, equivalent to a distance between, for example, the deflection polygon mirror 6 and the image carrier of the image forming machine in which the optical scanning device 1 is installed, by the cylindrical lens 14. Subsequently, the optical path adjusting device 15 is turned on the V-shaped support mount 17 so as to change a vertical position of the scanning beam coming out of the optical parallel 16 close to or away from the original optical path, providing an appropriate vertical displacement from the other scanning beam. FIGS. 5A and 5B show the optical parallel 16 turned about an optical path $S_1$ of the scanning beam impinging thereon through an angle of 180 from one to another, respectively. As shown in FIG. 5A, the optical parallel 16, which inclines forward and intersects the scanning beam impinging thereon at a certain angle, causes a specific displacement of optical path upward from the original optical path which depends upon the index of refraction of the optical parallel 16 and the incident angle of the scanning beam impinging upon the optical parallel 16. Similarly, as shown in FIG. 5B, the optical parallel 16, which inclines backward and intersects the scanning beam impinging thereon at an angle supplementary to the certain angle, causes the same displacement of optical path but downward. In other words, when turning the optical parallel 16 about the optical path ($S_1$) of the scanning beam impinging on the optical parallel 16, the optical path ($S_0$) of the scanning beam coming out of the optical parallel 16 moves in a circle with a radius equal to the displacement about the optical path ($S_1$) of the scanning beam impinging upon the optical parallel. Accordingly, a possible greatest shift of the scanning beam coming out of the optical parallel 16 in vertical position with respect to the position of the other scanning beam is twice as much as the displacement.

Figure 6:
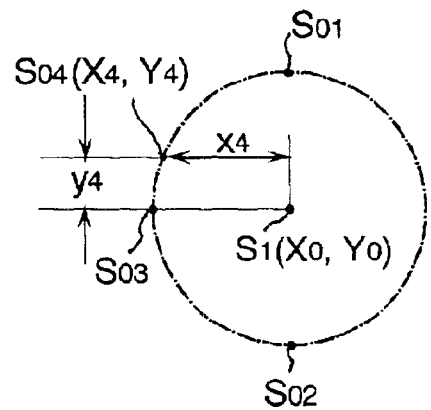
FIG. 6 is an explanatory illustration showing optical adjustment by the use of an optical parallel.

Specifically, as shown in FIG. 6, an original optical path of a scanning beam impinging on the optical parallel 16 passing a point $S_1$ is displaced to pass a point $S_{01}$ when coming out of the optical parallel 16. As the optical parallel 16 turns about the original optical path, the optical path of the scanning beam coming out of the optical parallel 16 shifts in a circle with a radius equal to the displacement from the point $S_{01}$ to a point $S_{02}$ through points $S_{04}$, $S_{03}$, . . . in turn as shown in FIG. 6. Letting X-Y coordinates of original optical paths of two scanning beams be ($X_0$, $Y_0$) and ($X_x$, $Y_0$), respectively when the optical parallel 16 turns through an angle about the original optical path until the optical path of the scanning beam coming out of the optical parallel 16 moves to the point $S_{04}$, the optical path of the scanning beam coming out of the optical parallel 16 passes a point having X-Y coordinate ($X_4$, $Y_4$). Therefore, the optical path of the scanning beam coming out of the optical parallel 16 is displaced by distances $X_4$, and $Y_4$ in X and Y directions, respectively, from the original optical path, and hence the optical path of the other scanning beam. Therefore, the scanning beams impinge on one of the side facets 6a of the deflection polygon mirror 6 at vertical positions separated by the distance $Y_4$ in the Y direction. This indicates that the two scanning beams scan the photosensitive drum at different points separated by the distance $Y_4$ in the secondary scanning direction, so as to form electrostatic latent images independently but simultaneously on the photosensitive drum. In consequence, a scanning speed for an image is substantially doubled with an effect of performing quick image forming. Similarly, the optical path of the scanning beam coming out of the optical parallel 16 is displaced by the distance $X_4$ in the X direction from the original optical path, and hence the optical path of the other scanning beam and, accordingly, impinges on one of the side facets 6a of the deflection polygon mirror 6 in a position separated by the distance $X_4$ in the X direction. This indicates that the two scanning beams scan the photosensitive drum at different points separated by the distance $X_4$ in the primary scanning direction. This displacement of scanning point in the primary scanning direction makes the scanning beams start scan from different points from each other. In order to eliminate the difference between starting points of scan, the laser sources 11 may be electronically controlled so as to generate laser beams at different timings, in other words, to make the scanning beams start scan at the same positions in the primary scanning direction.

Although the foregoing description has been directed to the optical path adjusting device 15 in which the optical parallel 16 turns about the original optical path of a scanning beam impinging thereon, it is not always necessary as long as the optical parallel 16 is at an angle less o greater than 90° with respect to the axis of turn that the axis of turn of the optical parallel 16 is coaxial with the original optical path of the scanning beam impinging upon the optical parallel 16.

When the adjustment of vertical position of an optical path of the scanning beam is completed, the optical path adjusting device 15 is fixedly adhered, or otherwise secured, to the V-shaped support mount 17, completing adjustment of the light source unit 3. Thereafter, the light source mount 10 is located in a predetermined relative position on the box-shaped plastic housing 2 of the optical scanning device 1 by engaging the positioning bosses with the positioning holes 18 of the light source mount 10 and secured to the box-shaped plastic housing 2 of the optical scanning device 1 in a well known manner. As a result, the scanning beams emanating from the laser beams 11 are appropriately directed to the reflection mirror 5. The optical scanning device 1 is attached to the image forming machine in a predetermined relative position by engaging the positioning bosses 9 with the positioning recesses of the housing frame of the image forming machine. Finally, optical adjustment of the image forming machine is achieved by adjusting an optical path to the photosensitive drum that is provided by the reflection mirror 5, the deflection polygon mirror 6, the fθ lens system 7 and the reflection mirror arrangement 8, thereby completing the image forming machine.

According to the optical path adjusting device 15 for varying the optical path of a light beam coming out thereof from the original optical path of the light beam by varying an incident angle of the light beam impinging upon the optical parallel 16, the optical path of the light beam coming out of the optical path adjusting device 15 moves in a circle with a radius equal to the displacement while the optical parallel 16 turns through 180°, there is caused a small shift of vertical position of the optical path of the light beam coming out of the optical parallel 16 per unit angle of turn of the optical parallel 16, so as to enable precisely adjusting the vertical position of the optical path of the laser beam coming out of the optical parallel 16.

Figure 7:
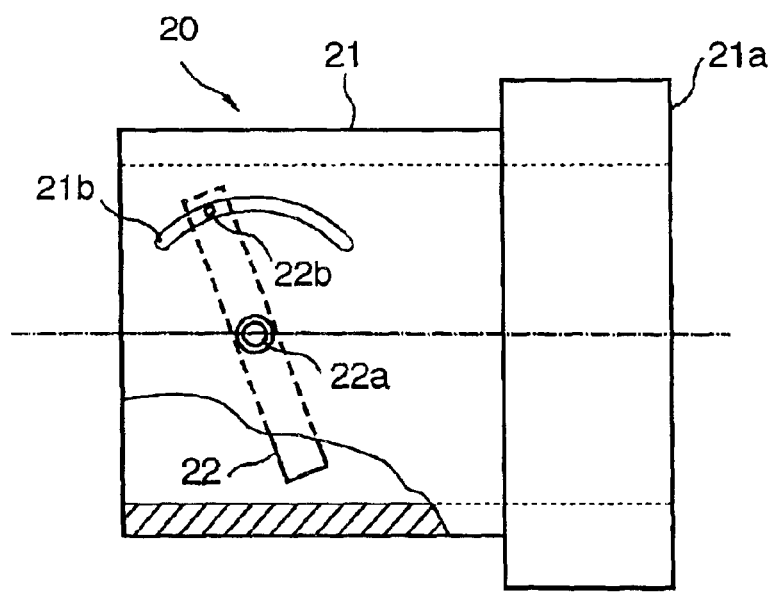
FIG. 7 is a partial cutaway side view of an optical path adjusting device having an optical parallel in accordance with another embodiment of the present invention.
Figure 8:
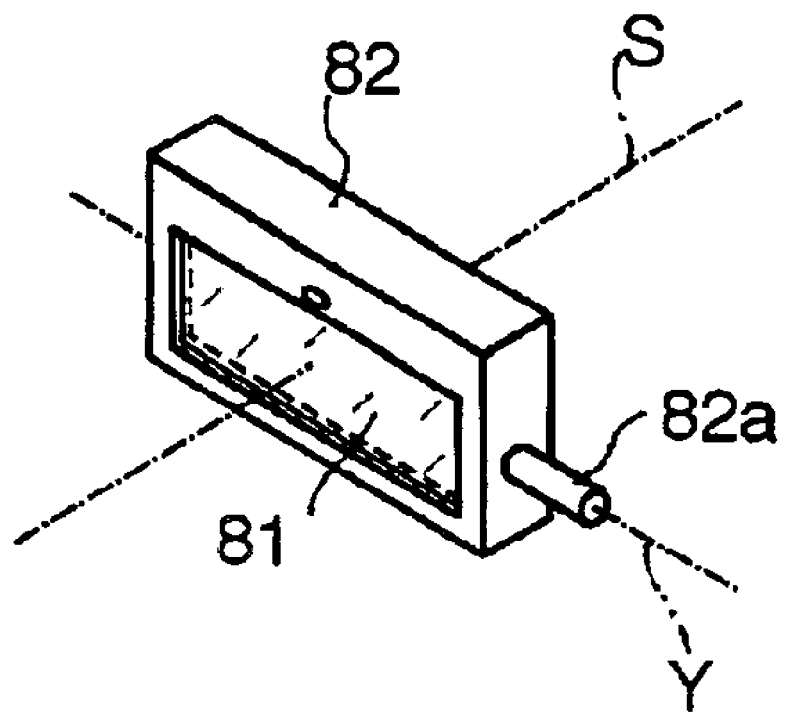
FIG. 8 is a perspective view of a prior art optical path adjusting device having an optical parallel.

FIG. 7 shows an optical path adjusting device 20 according to another embodiment of the present invention which enables adjusting a vertical position of an optical path of a light source coming out thereof with improved precision. As shown, the optical path adjusting device 20 comprises a hollow cylindrical barrel 21 having an extension 21a enlarged in external diameter and an optical parallel 22 disposed in the inside of the hollow cylindrical barrel 21. The hollow cylindrical barrel 21 is formed with a circular-arcuate guide slot 21b. The optical parallel 22 at opposite sides is fixedly provided with pivot shafts 22a extending laterally. The optical parallel 22 is pivotally mounted to the hollow cylindrical barrel 21 by the pivot shafts 22a so that the optical parallel 22 has an axis of pivotal movement in a straight line included in a vertical plane perpendicular to a center axis of the hollow cylindrical barrel 21. The circular-arcuate guide slot 21b has a center at the pivot shaft 22a. The optical parallel 22 at one of the opposite sides is further fixedly provided with a guide pin 22b. The guide pin 22b is movably received in the circular-arcuate guide slot 21b. Therefore, when the guide pin 22b moves in the circular-arcuate guide slot 21b, the optical parallel 22 changes an angle at which it intersects the center axis of the hollow cylindrical barrel 21 in an extent defined by the length of the circular-arcuate guide slot 21b. The guide pin 22b has a sufficient length necessary to keep engagement with the circular-arcuate guide slot 21b along the entire length of the circular-arcuate guide slot 21b. When the optical parallel 22 swings about the axis of the pivot shafts 22a, a beam impinging on the optical parallel 22 varies its incident angle, so that a optical path of the beam coming out of the optical parallel 21 travels along a optical path displaced from the original optical path. The displacement of the beam coming out of the optical parallel 22 depends upon an angle of swing of the optical parallel 22, in other words, a position of the guide pin 22b in the guide slot 21b.

The optical path adjusting device 20 is mounted on the V-shaped support mount 17 of the optical scanning device 1 with the center axis of the hollow cylindrical barrel 21 in alignment with an optical path of a scanning beam emanating from one of the light sources 11. Thereafter, the optical parallel 22 is swung until it produces a roughly desired displacement of the optical path of the scanning beam coming out of the optical parallel 22 from the original optical path between positions $S_{o1}$ and $S_{o2}$ (see FIG. 6). After the adjustment of a desired displacement of the optical path is attained, the guide pin 22b in the guide slot 21b are fixedly adhered to the hollow cylindrical barrel 21. The pivotal shafts 22a are preferably fixedly adhered to the hollow cylindrical barrel 21. This prevents the optical parallel 22 from accidentally changing in position.

Then, the hollow cylindrical barrel 21 is rotated so as to shift a vertical position of the optical path of the scanning beam coming out of the optical parallel 22 with respect to the original optical path in the same manner as described with respect to the optical path adjusting device 15 of the previous embodiment. Finally, the hollow cylindrical barrel 21 is fixedly adhered, or otherwise secured, to the V-shaped support mount 17 of the optical scanning device 1.

As apparent from the above description, according to the optical path adjusting device 20, after roughly adjusting a displacement of an optical path of a scanning beam coming out of the optical path adjusting device 20 from the original optical path by moving the guide pin 22b in the guide slot 21b, it is achieved by rotating the hollow cylindrical barrel 21 to make precise adjustment of a vertical position of the optical path of the scanning beam coming out of the optical path adjusting device 20 with respect to the original optical path, and hence an optical path of the other scanning beam.

It is to be understood that although the present invention has been described in detail with respect to the preferred embodiments thereof, various other embodiments and variants may occur to those skilled in the art, which are within the scope and spirit of the invention, and such other embodiments and variants are intended to be covered by the following claims.

What is claimed is:

1. An optical path adjusting device for an optical scanning device for adjusting a vertical position of a light beam coming out of said optical path adjusting device in parallel with an original path of said light beam with respect to said original optical path, said optical path adjusting device comprising:

an optical parallel having plane parallel surfaces which causes a displacement of an optical path of a light beam coming out thereof in parallel with said light beam incident thereupon from an original optical path of said light beam;

a mount fixedly mounting said optical parallel thereon so that said optical parallel intersects said original optical path of said light beam at an angle of intersection except a right angle so as to cause a specified displacement of said optical path of said light beam coming out of said optical parallel from said original optical path of said light beam; and a support block supporting said mount thereon for rotation of said optical parallel about said original optical path of said light beam.

2. An optical path adjusting device as defined in claim 1, wherein said mount comprises a hollow cylindrical barrel having a center axis in alignment with said original optical path of said light bam.

3. An optical path adjusting device as defined in claim 1, wherein said support block has a V-shaped support surface on which said hollow cylindrical barrel is supported.

4. An optical path adjusting device as defined in claim 2, wherein said hollow cylindrical barrel at one of extreme ends is formed with a mounting surface inclined at said angle of intersection with respect to said center axis on which said optical parallel is mounted.

5. An optical path adjusting device as defined in claim 2, wherein said hollow cylindrical barrel comprises a hollow cylindrical body which is supported on said support and a hollow cylindrical extension which is coaxial with said hollow cylindrical body and has an external diameter greater than that of said hollow cylindrical body and on which said optical parallel is mounted thereon at said angle of intersection.

6. An optical path adjusting device for an optical scanning device for adjusting a vertical position of a light beam coming out of said optical path adjusting device in parallel with an original path of said light beam with respect to said original optical path, said optical path adjusting device comprising:

an optical parallel having plane parallel surfaces which causes a displacement of an optical path of a light beam coming out thereof in parallel with said light beam incident thereupon from an original optical path of said light beam;

mounting means for mounting said optical parallel thereon so that said optical parallel intersects said original optical path of said light beam at an angle of intersection except a right angle so as to cause a specified displacement of said optical path of said light beam coming out of said optical parallel from said original optical path of said light beam;

adjusting means for varying said angle of intersection so as thereby to adjust a displacement of said optical path of said light beam coming out of said optical parallel from said original optical path of said light beam;

a support block supporting said mounting means thereon for rotation of said optical parallel about said original optical path of said light beam.

7. An optical path adjusting device as defined in claim 6, wherein said mounting means comprises a hollow cylindrical barrel which has a center axis in alignment with said original optical path of said light beam and a pivot shaft having a pivot axis perpendicular to said center axis of said hollow cylindrical barrel which supports said optical parallel in said hollow cylindrical barrel so that said optical parallel o pivotally swing about said pivot axis of said pivot shaft.

8. An optical path adjusting device as defined in claim 7, wherein said adjusting means comprises a circular-arcuate guide slot formed in said hollow cylindrical barrel and a guide pin secured to said optical parallel and received in said guide slot, said circular-arcuate guide slot a center having a center at said pivot axis of said pivot shaft.

9. An optical path adjusting device as defined in claim 7, wherein said support block has a V-shaped support surface on which said hollow cylindrical barrel is supported.

* * * * *